(12) United States Patent
Chen et al.

(10) Patent No.: US 8,539,579 B2
(45) Date of Patent: Sep. 17, 2013

(54) DETECTING SPAM SHORT MESSAGES BASED ON SENDING CHARACTERISTICS

(75) Inventors: Xiao Yan Chen, Beijing (CN); Ping Pan, Beijing (CN); Chen Wang, Beijing (CN); Chun Ying, Beijing (CN); Yi Bo Zhang, Beijing (CN); Yanfeng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/824,668

(22) Filed: Jun. 28, 2010

(65) Prior Publication Data

US 2011/0023116 A1 Jan. 27, 2011

(30) Foreign Application Priority Data

Jun. 29, 2009 (CN) .......................... 2009 1 0150946

(51) Int. Cl.
*G06F 21/00* (2013.01)
*H04W 4/00* (2009.01)

(52) U.S. Cl.
USPC ................. 726/22; 726/23; 726/25; 709/206; 455/466

(58) Field of Classification Search
USPC ....................... 726/22–25; 455/466; 709/206
See application file for complete search history.

(56) References Cited

U.S. PATENT DOCUMENTS

| 2006/0053203 | A1* | 3/2006 | Mijatovic ...................... 709/206 |
| 2006/0079255 | A1* | 4/2006 | Bantukul et al. .............. 455/466 |
| 2007/0121596 | A1* | 5/2007 | Kurapati et al. .............. 370/356 |
| 2007/0254683 | A1* | 11/2007 | Jie et al. ........................ 455/466 |
| 2008/0102799 | A1* | 5/2008 | Dholakia et al. ........... 455/412.1 |
| 2008/0167024 | A1 | 7/2008 | Zabawskyj et al. |
| 2008/0194241 | A1* | 8/2008 | Kretz ............................. 455/417 |
| 2008/0227452 | A1* | 9/2008 | Sayeedi ........................ 455/436 |
| 2009/0013054 | A1* | 1/2009 | Libbey et al. ................ 709/207 |
| 2009/0047971 | A1* | 2/2009 | Fu ................................. 455/450 |
| 2009/0061863 | A1* | 3/2009 | Huggett et al. .............. 455/434 |
| 2009/0216841 | A1* | 8/2009 | Choi et al. .................... 709/206 |
| 2010/0145900 | A1* | 6/2010 | Zheng et al. .................... 706/52 |

FOREIGN PATENT DOCUMENTS

CN 101335920 12/2008

* cited by examiner

*Primary Examiner* — Haresh N Patel
(74) *Attorney, Agent, or Firm* — Thomas Grzesik; Fleit Gibbons Gutman Bongini & Bianco PL

(57) ABSTRACT

A method and apparatus for spam short message detection. The method includes obtaining sending characteristics of at least two suspected short message sources, judging whether the two suspected short message sources have similar sending characteristics, and determining the two suspected short message sources as spammer if they have similar sending characteristics. A spammer that makes multiple short message sources send short messages alternately can be detected through similar sending characteristics of the short message sources.

16 Claims, 3 Drawing Sheets

DETECTING SPAM SHORT MESSAGES BASED ON SENDING CHARACTERISTICS

CROSS REFERENCE TO RELATED APPLICATION

This application claims priority under 35 U.S.C. 119 from Chinese Patent Application 200910150946.5, filed Jun. 29, 2009, the entire contents of which are incorporated herein by reference.

BACKGROUND OF THE INVENTION

1. Field of the Invention

The present invention relates to the field of information processing, more particularly, to a method and apparatus for spam short message detection.

2. Description of Related Art

Spam short message has seriously influenced user experience and system performance. There are already a variety of approaches for detecting spam short message. According to user feedback based approach, a user will identify and report a spammer. According a to social network based approach, a social network archive is established for each user and a short message sent by the user to other users outside of the social network is determined as a spam short message. The problem is, a large data record system is required to store the reported spammer or the social network archive, and that data record system needs to be shared among various service operators, which is infeasible for the operators.

According to short message content-based approach, a short message will be determined as a spam short message if it contains a preset keyword. The problem is, if the set of the keywords is too small, it will cause high false negative rate, and if it is too large, it will affect detection speed; and checking short message content may lead to privacy concern; a spammer can escape from detection with simple flexible manners such as inserting a space within a keyword.

According to an approach based on short message sending speed, a short message source will be determined as a spammer if it sends a bulk of short messages in a short time. However, this has a drawback. The spammer can reduce number of short messages sent by each short message source within a short time by making multiple short message sources send short messages alternately, while a normal user may send a bulk of short messages in a short time under some circumstance.

Thus, there are drawbacks of poor availability or easy avoidance in existing spam short message detection methods that are based on a single short message source characteristic.

SUMMARY OF THE INVENTION

In view of the above, the present invention provides a novel method for detecting spam short message such that a spammer cannot escape from detection through the above-mentioned simple means.

In accordance with an aspect of the present invention, a computer implemented method for spam short message detection includes the steps of: obtaining sending characteristics of at least two suspected short message sources; judging whether the two suspected short message sources have similar sending characteristics; and determining the two suspected short message sources as spammer if they have similar sending characteristics.

In accordance with another aspect of the present invention, apparatus for spam short message detection includes: obtaining means configured to obtain sending characteristics of at least two suspected short message sources; judging means configured to judge whether the two suspected short message sources have similar sending characteristics; and determining means configured to determine the two suspected short message sources are spammer if the two suspected short message sources have similar sending characteristics.

With the technical solution according to the embodiment of the present invention, a spammer that makes multiple short message sources send short messages alternately can be detected through similar sending characteristics of the short message sources.

DETAILED DESCRIPTION OF THE PREFERRED EMBODIMENTS

A detailed description of the preferred embodiments of the method and apparatus for spam short message detection provided by the present invention is described in conjunction with accompanying drawings. When a first element is described to be connected to a second element, the first element not only can be directly connected to the second element, but also can be indirectly connected to the second element through a third element. Furthermore, for the sake of clarity, some elements that are unnecessary to fully understand the present invention are omitted.

As described above, current spammer often makes multiple short message sources send short messages alternately by software, so that the spammer can send required number of short messages, and meanwhile escape from detection that is based on sending speed. However, in this case, the plurality of controlled short message sources often possess similar sending characteristic. Thus, a plurality of short message sources can be preliminary judged as spammer if it is detected that they have similar sending characteristic.

Figure 1:
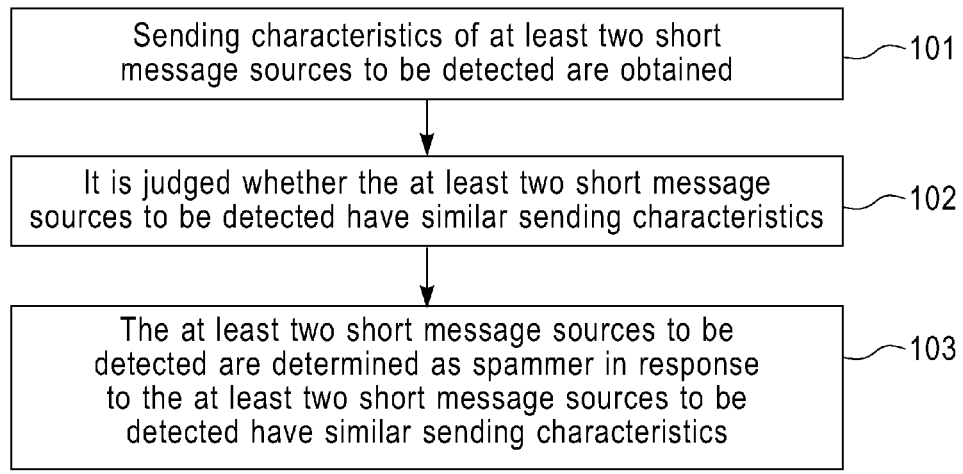
FIG. 1 is a flowchart of a method for spam short message detection according to an embodiment of the present invention.

FIG. 1 is a flowchart of a method for spam short message detection according to an embodiment of the present invention.

At step 101, sending characteristics of at least two suspected short message sources, i.e. at least two short message sources to be detected, are obtained.

At step 102, it is judged whether the at least two suspected short message sources have similar sending characteristics.

At step 103, the at least two suspected short message sources are determined as spammers if the at least two suspected short message sources have similar sending characteristics.

Sending characteristics of suspected short message sources may include many aspects, for example, sending location characteristics, sending location change characteristics, content length characteristics, time domain sending characteristics such as sending speed and sending volume, frequency domain sending characteristics such as periodicity, etc. It will be readily appreciated by those skilled in the art that other types of sending characteristics can also be employed in the present invention, as long as this kind of sending characteristics is comparable. Submission characteristics referred to here is not limited to technology area of spamming detection, and is also compatible to other comparable submission features.

According to a first embodiment of the present invention, sending location characteristics are employed as comparison metric, that is, it is judged whether at least two suspected short message sources have similar sending location characteristics, and the at least two suspected short message sources are determined as spammer if the at least two suspected short message sources have similar sending location characteristics. This is because several short message sources often are located at approximate sending location when they are controlled by software to send messages alternately.

Sending location characteristics of suspected short message sources may be represented by identifier of a base station covers that location, i.e., the base station that is serving the suspected short message sources. Suspected short message sources corresponding to a same base station identifier, that is, suspected short message sources served by a same base station, may be considered to be in approximate location. How to determine a base station that is serving suspected short message sources is known technology and need not be described here. A populous district is often covered by a plurality of base stations. At this time, a suspected short message source may be served by one base station when sending one piece of short message, and may be served by another base station when sending another piece of short message. In this case, sending location characteristics is represented by a set of base station identifiers.

If the number of base station identifiers that is commonly corresponded to by two suspected short message sources exceeds a first threshold, the two suspected short message sources may be considered to be in approximate location. For example, if base station identifiers corresponded to a first suspected short message source are A, B, C, D, E, and base station identifiers corresponded to a second suspected short message source are B, C, D, E, F, and the first threshold is 3, then the first suspected short message source and the second suspected short message source may be considered to be in approximate location.

The threshold may also be a relative number, i.e., a ratio of the number of base station that is commonly corresponded to by two suspected short message sources to the number of base station identifiers respectively corresponded to by two suspected short message sources. Accordingly, the first threshold may also be a proportional value. In the above example, if the first threshold is 60%, then the first suspected short message source and the second suspected short message source may be considered to be in approximate location. As the development of positioning technology, coordinates of suspected short message source may also be directly obtained. In this case, coordinates of two suspected short message sources may be directly compared to determine whether the two suspected short message sources are in approximate location.

According to a second embodiment of the present invention, sending location change characteristics are employed as a comparison metric, that is, it is judged whether at least two suspected short message sources have similar sending location change characteristics, and the at least two suspected short message sources are determined as spammer if the at least two suspected short message sources have similar sending location change characteristics. As described above, suspected short message sources may either be covered by one base station, or may be covered by a set of base stations.

If suspected short message sources are covered by one base station, a sequence of identifiers of base station that covers the suspected short message sources on a series of same time domain sample points is taken for performing comparison. Specifically, if a proportion of the number of times two suspected short message sources are covered by a same base station on a same time domain sample point occupies in total time domain sample times exceeds a second threshold, then the two suspected short message sources may be considered to have similar sending location change characteristics.

For example, if on a series of same time domain sample points such as 09:00 6-6-2006, 09:10 6-6-2006, 09:20 6-6-2006, 09:30 6-6-2006, 09:40 6-6-2006, a first suspected short message source is covered by base station A, base station B, base station C, base station D, base station E, respectively, a second suspected short message source is covered by base station A, base station B, base station C, base station D, base station F, respectively, and the second threshold is 3 or 60%, then it can be considered that the first suspected short message source and the second suspected short message source have similar sending location change characteristics.

Figure 2:
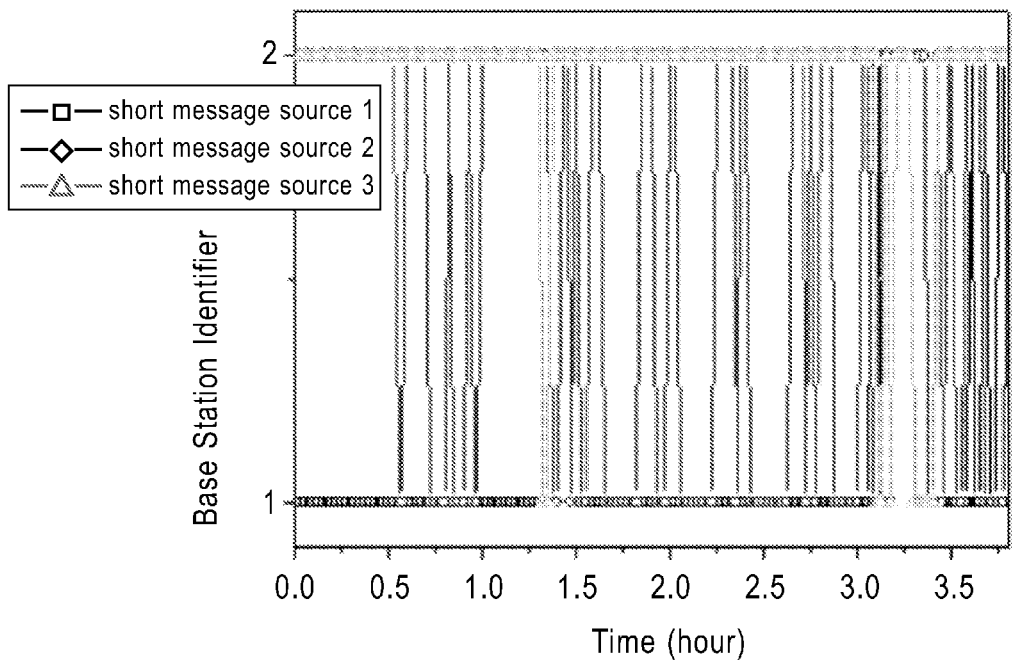
FIG. 2 is a handoff illustration of short message sources covered by a plurality of base stations.

What is described below is how to determine that two suspected short message sources have similar sending location change characteristics in case that the suspected short message source is covered by a set of base stations. First, as shown in FIG. 2, if a suspected short message source is covered by a plurality of base stations, then the base station actually servers this suspected short message source will be switched among these plurality of base stations, even if the suspected short message source is static. In this case, the method of taking a sequence of identifiers of base station that covers the suspected short message sources on a series of time domain sample points for performing comparison may also be used.

As an alternative, serving base station uncertainty index H is introduced to represent sending location change characteristics. Serving base station uncertainty index H is such an index: it has a first extreme and a second extreme, one of which is a maximum value, and the other is a minimum value; for N number of possible cases, N number of corresponding probabilities are $p_1, p_2 \ldots p_N$, wherein $p_1, p_2 \ldots p_N$ [0,1] and $p_1 + p_2 \ldots + p_N = 1$, under most uncertain cases, i.e., when $p_1 = p_2 = \ldots = p_N$, serving base station uncertainty index H reaches an extreme; under most certain cases, i.e., when any one of $p_1, p_2 \ldots p_N$ is 1 and all others are 0, serving base station uncertainty index H reaches another extreme. Serving base station uncertainty index may be defined as follows:

$$H = -\sum_{i=1}^{N} p_i \log_2 p_i \quad (1)$$

Or it may be defined as follows:

$$H = \frac{1}{\sum_{i=1}^{N} p_i^a} \quad a > 1 \quad (2)$$

A person skilled in the art can devise any suitable manner that satisfies the above condition to define serving base station uncertainty index H. $p_i$ can be obtained by collecting statistics in a predefined time interval.

In case that an embodiment of the present invention uses serving base station uncertainty index H to characterize sending location change characteristics of a suspected short message source, a preferred definition of the serving base station uncertainty index H should meet the following conditions: if under most uncertain situation, the extreme of the serving base station uncertainty index H is a maximum value, then the maximum value increases as the number of base stations N increases; if under most uncertain situation, the extreme of the serving base station uncertainty index H is a minimum value, then the minimum value decreases as the number of base stations N increases. This is because, when deploying base stations, mobile operators typically will, to the best of their abilities, make each point covered by a same number of base stations. Thus, the number of base stations serving one suspected short message source can at least partly reflect sending location change characteristics of that suspected short message source.

If serving base station uncertainty index H's value ranges at different N, especially value ranges that are close to most uncertain cases, overlap very seriously, then sensitivity of serving base station uncertainty index H of a suspected short message source to number of base stations serving that suspected short message source will be reduced, so that ability of serving base station uncertainty index H of a suspected short message source to reflect sending location change characteristics of that suspected short message source will be weakened.

For N=3, if within 10 minutes starting from some point in time, the time a first base station actually serves the suspected short message source is 3 minutes, the time a second base station actually serves the suspected short message source is 5 minutes, the time a third base station actually serves the suspected short message source is 2 minutes, then $p_1$=0.3, $p_2$=0.5 and $p_3$=0.2. Thus, nonce values of serving base station uncertainty index H of the suspected short message source can be obtained. With different points in time and different lengths of predefined time interval, the calculated nonce values of serving base station uncertainty index H are also different. Statistical characteristics of serving base station uncertainty index H can be obtained by calculating nonce values of serving base station uncertainty index H multiples times for a same suspected short message source.

Figure 3A:
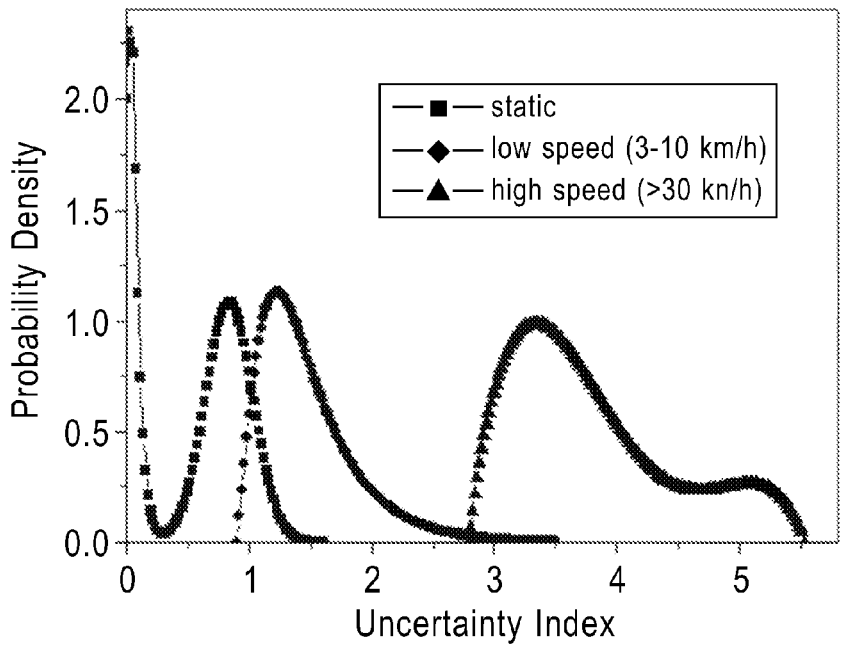
FIG. 3(A) shows probability distributions of serving base station uncertainty indexes of three types of short message sources with different sending location change characteristics.

It has been found by experiment that, for suspected short message sources with different sending location change characteristics, statistical characteristics of their serving base station uncertainty index H are also different. FIG. 3(A) shows probability distributions of serving base station uncertainty index H of three types of short message sources which is static, low speed moving and high speed moving, the manner to calculate serving base station uncertainty index H is (1), the vertical axis represents probability density, and the horizontal axis represents value of serving base station uncertainty index H. It can be seen from FIG. 3(A) that, the difference in locations of peaks of serving base station uncertainty index H is very obvious.

Figure 3B:
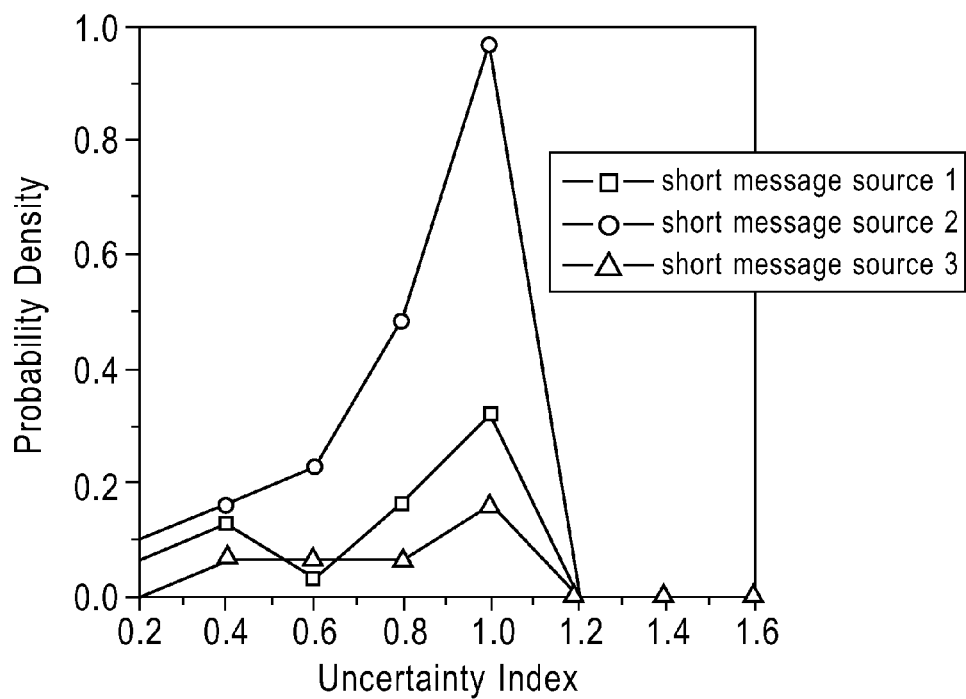
FIG. 3(B) shows probability distributions of serving base station uncertainty indexes of three static short message sources.

In addition, the difference in distribution ranges of serving base station uncertainty index is also very obvious, for example, the distribution range of serving base station uncertainty index H of a static short message source is under 1.0, the distribution range of serving base station uncertainty index H of a low speed moving short message source is 1.0 to 2.6, and the distribution range of serving base station uncertainty index H of a high speed moving short message source is above 2.6, etc. FIG. 3(B) shows probability distributions of serving base station uncertainty index H of three different static suspected short message sources, the manner to calculate serving base station uncertainty index H is (1), the vertical axis represents probability density, and the horizontal axis represents value of serving base station uncertainty index H. It can be seen from FIG. 3(B) that, for static short message sources, peak locations of probability distributions of their serving base station uncertainty index H are very close, and distribution ranges are also very close.

Based on these discoveries, whether two suspected short message sources have similar sending location change characteristics can be determined by comparing statistical characteristics of serving base station uncertainty index H of the two suspected short message sources. For example, if nonce values of serving base station uncertainty index H calculated for these two suspected short message sources in a same predefined time interval are within a same distribution range, such as all within range of 1.0 to 2.6, then the two suspected short message sources are considered to have similar sending location change characteristics.

Again, for example, if peak locations of probability distributions of serving base station uncertainty index H of these two suspected short message sources in a same predefined time interval are very close, then the two suspected short message sources are considered to have similar sending location change characteristics. Still, for example, if serving base station uncertainty index H of these two suspected short message sources in a same predefined time interval have other similar statistical characteristics, such as similar average value, or similar average value and similar variance, then the two suspected short message sources are considered to have similar sending location change characteristics.

When performing actual detection, since the number of suspected short message sources is very huge, a clustering method is introduced for both the first embodiment and the second embodiment. In addition, the first embodiment and the second embodiment can be combined so as to improve efficiency and accuracy of judgment. For example, since the judgment of the first embodiment is relatively simple, all suspected short message sources can first be grouped according to corresponded base station identifier, the suspected short message sources in a same group have similar sending location characteristics. Then, suspected short message sources that have similar sending location change characteristics are located within the same group. If some suspected short message sources whose sending location characteristics are very similar and whose sending location change characteristics are also very similar are found, then these suspected short message sources may be considered as spammer.

According to a third embodiment of the present invention, IMEI (International Mobile Equipment Identity) is employed as comparison metric, that is, it is judged whether the at least two suspected short message sources have same IMEI, and the at least two suspected short message sources are determined as spammer if the at least two suspected short message sources have same IMEI. The embodiment has the feature of high efficiency and accuracy in case that a special-purpose spam short message sending device is used. A plurality of SIM cards can be inserted into such special-purpose spam short message sending device, and spam short messages are sent based on these SIM cards, respectively. Although senders, i.e., number of SIM card, of these spam short messages are different, their IMEI are the same. According to the present embodiment, it may further include disabling that IMEI, so as to solve the problem of continue to send spam short messages by changing SIM cards.

As mentioned above, sending characteristics of suspected short message sources, e.g., sending location characteristics, sending location change characteristics, length characteristics of sending short messages, time domain sending characteristics, frequency domain sending characteristics, may all be used in the embodiment of the present invention. These sending characteristics can be used separately, or can be used in combination. For example, a set of suspected short message sources may be considered as spammer only if the set of suspected short message sources has similar location characteristics, similar sending location change characteristics and similar characteristics of length of sending short messages. Again, for example, in case that uniqueness of IMEI cannot be guaranteed, for a set of suspected short message sources with same IMEI, the set of suspected short message sources will be considered as spammer only if their sending location characteristics or sending location change characteristics are also similar.

Figure 4:
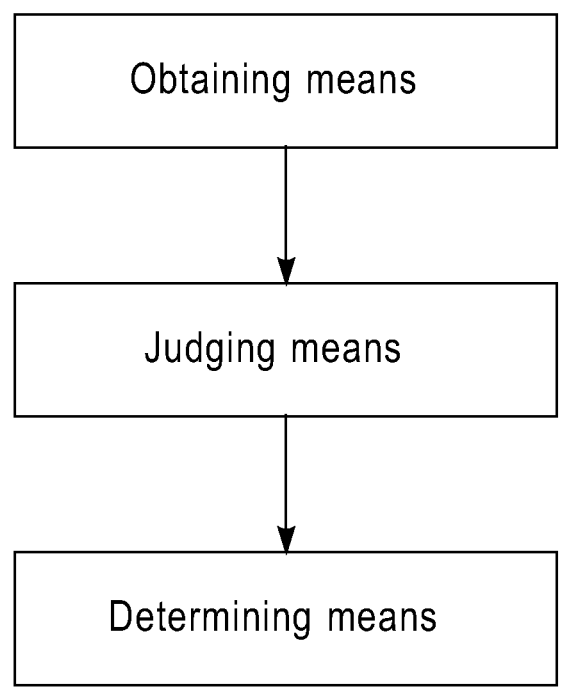
FIG. 4 is a block diagram of an apparatus for spam short message detection according to an embodiment of the present invention.

FIG. 4 is a block diagram of an apparatus for spam short message detection according to an embodiment of the present invention. The apparatus includes an obtaining module configured to obtain sending characteristics of at least two suspected short message sources, a judging module configured to judge whether the at least two suspected short message sources have similar sending characteristics, and a determining module configured to determine the at least two suspected short message sources as spammer if the at least two suspected short message sources have similar sending characteristics.

It may be appreciated by a person skilled in the art that, the above method and system can be implemented by using computer executable instructions and/or included in processor control codes, which are provided on carrier medium such as disk, CD or DVD-ROM, programmable memory such as read-only memory or data carrier such as optical or electrical signal carrier. The apparatus for spam short message detection and its components can be implemented by hardware circuit such as large scale integrated circuit or gate arrays, semiconductors such as logic chip or transistors, or programmable hardware devices such as field programmable gate array, programmable logic device, or can be implemented by software executed by various types of processors, or can be implemented by a combination of the above hardware circuit and software, such as firmware.

Although some exemplary embodiments of the present invention have been illustrated and described, those skilled in the art will appreciate that, changes to these embodiments can be made without departing from the principle and spirit of the invention, the scope of the invention is defined by claims and their equivalent transformations.

The invention claimed is:

1. A computer implemented method for detecting spam short messages, the method comprising:
    obtaining a first set of short message sending characteristics of a first suspected short message source and at least a second set of short message sending characteristics of at least a second suspected short message source, wherein the first set of short message sending characteristics comprises a first set of base station identifiers associated with the first suspected short message source, and wherein the second set of short message sending characteristics comprises a second set of base station identifiers associated with second suspected short message source;
    comparing, with a processor, at least the first set of base station identifiers and the second set of base station identifiers; and
    determining, based on the comparing, that each of the first and second suspected short message sources are spammers based on the first and second sets of base station identifiers being similar within a given threshold.

2. The method of claim 1, wherein each of the first and second sets of short message sending characteristics further comprises a first set of sending location characteristics and a second set of sending location characteristics, respectively, and
    wherein the comparing further compares the first and second sets of sending location characteristics.

3. The method of claim 1, wherein each of the first and second sets of short message sending characteristics further comprises a first set of sending location change characteristics and a first set of sending location change characteristics, respectively, wherein the first and second sets of sending location change characteristics identify changes in locations from which the first and second short message sources sent a short message, and
    wherein the comparing further compares the first and second sets of sending location characteristics.

4. The method of claim 1, wherein each of the first and second sets of short message sending characteristics further comprises a first set of sending location characteristics and a second set of sending location characteristics, respectively, and
    wherein each of the first and second sets of short message sending characteristics further comprises a first set of sending location change characteristics and a first set of sending location change characteristics, respectively, wherein the first and second sets of sending location change characteristics identify changes in locations from which the first and second suspected short message sources sent a short message,
    wherein the comparing further comprises
        comparing the first and second sets of sending location characteristics; and
        based on the first and second sets of sending location characteristics matching within a given threshold, comparing the first and second sets of sending location change characteristics, and
    wherein the determining further comprises determining that the each of the first and second suspected short message sources are spammers based on the first and second sets of sending location change characteristics matching within a given threshold.

5. The method of claim 4, wherein the first set of sending change location characteristics comprises a first set of statistical characteristics of a first serving base station uncertainty index associated with the first suspected short message source, and
    wherein the second set of sending change location characteristics comprises a second set of statistical characteristics of a second serving base station uncertainty index associated with the second suspected short message source,
    wherein comparing the first and seconds sets of sending location change characteristics comprises comparing the first and second sets of statistical characteristics, and
    wherein the determining comprises determining that the each of the first and second suspected short message sources are spammers based the first and second sets of statistical characteristics matching within a given threshold.

6. The method of claim 5, wherein the first and second sets of statistical characteristics are peak location of probability distributions of the first and second serving base station uncertainty indexes, respectively.

7. The method of claim 5, wherein each of the first and second serving base station uncertainty indexes meets the following conditions:
when under a most uncertain situation, an extreme reached by a serving base station uncertainty index is a maximum value, then a maximum value increases as a number of base stations increases; and
when under a most uncertain situation, an extreme reached by a serving base station uncertainty index is a minimum value, then a minimum value decreases as a number of base stations increases.

8. The method of claim 4, wherein the first set of sending change location characteristics comprises a first set of calculated nonce values of a first serving base station uncertainty index associated with the first suspected short message source, and
wherein the second set of sending location change characteristics comprises a second set of calculated nonce values of a second serving base station uncertainty index associated with the second suspected short message source,
wherein comparing the first and seconds sets of sending location change characteristics comprises comparing the first and second sets of nonce values, and
wherein the determining comprises determining that the each of the first and second suspected short message sources are spammers based the first and second sets of nonce values falling within a same one of a plurality of predefined distribution ranges.

9. An apparatus for spam short message detection, the apparatus comprising:
a memory;
a processor;
an obtaining module to obtain a first set of short message sending characteristics of a first suspected short message source and at least a second set of short message sending characteristics of at least a second suspected short message source, wherein the first set of short message sending characteristics comprises a first set of base station identifiers associated with the first suspected short message source, and wherein the second set of short message sending characteristics comprises a second set of base station identifiers associated with second suspected short message source;
a judging module to compare at least the first set of base station identifiers and the second of set of base station identifiers; and
a determining module to determine, based on the comparing, that each of the first and second suspected short message sources are spammers based on the first and second sets of base station identifiers being similar within a given threshold.

10. The apparatus of claim 9, wherein each of the first and second sets of short message sending characteristics further comprises a first set of sending location characteristics and a second set of sending location characteristics, respectively, and
wherein the judging module compares by further comparing the first and second sets of sending location characteristics.

11. The apparatus of claim 9, wherein each of the first and second sets of short message sending characteristics further comprises a first set of sending location change characteristics and a first set of sending location change characteristics, respectively, wherein the first and second sets of sending location change characteristics identify changes in locations from which the first and second short message sources sent a short message, and
wherein the judging module compares by further comparing the first and second sets of sending location characteristics.

12. The apparatus of claim 11, wherein the first set of sending change location characteristics comprises a first set of calculated nonce values of a first serving base station uncertainty index associated with the first suspected short message source, and
wherein the second set of sending location change characteristics comprises a second set of calculated nonce values of a second serving base station uncertainty index associated with the second suspected short message source,
wherein comparing the first and seconds sets of sending location change characteristics comprises comparing the first and second sets of nonce values, and
wherein the determining module determines by determining that the each of the first and second suspected short message sources are spammers based the first and second sets of nonce values falling within a same one of a plurality of predefined distribution ranges.

13. The apparatus of claim 11, wherein the first set of sending change location characteristics comprises a first set of statistical characteristics of a first serving base station uncertainty index associated with the first suspected short message source, and
wherein the second set of sending change location characteristics comprises a second set of statistical characteristics of a second serving base station uncertainty index associated with the second suspected short message source,
wherein comparing the first and seconds sets of sending location change characteristics comprises comparing the first and second sets of statistical characteristics, and
wherein the determining module determines by determining that the each of the first and second suspected short message sources are spammers based the first and second sets of statistical characteristics matching within a given threshold.

14. The apparatus of claim 13, wherein the first and second sets of statistical characteristics are peak location of probability distributions of the first and second serving base station uncertainty indexes, respectively.

15. The apparatus of claim 13, wherein each of the first and second serving base station uncertainty indexes meets the following conditions:
when under a most uncertain situation, an extreme reached by a serving base station uncertainty index is a maximum value, then a maximum value increases as a number of base stations increases; and
when under a most uncertain situation, an extreme reached by a serving base station uncertainty index is a minimum value, then a minimum value decreases as a number of base stations increases.

16. The apparatus of claim 9, wherein each of the first and second sets of short message sending characteristics further comprises a first set of sending location characteristics and a second set of sending location characteristics, respectively, and
wherein each of the first and second sets of short message sending characteristics further comprises a first set of sending location change characteristics and a first set of sending location change characteristics, respectively, wherein the first and second sets of sending location change characteristics identify changes in locations from which the first and second suspected short message sources sent a short message,
wherein the judging module compares by:
 comparing the first and second sets of sending location characteristics; and
 based on the first and second sets of sending location characteristics matching within a given threshold, comparing the first and second sets of sending location change characteristics, and
wherein the determining module determines by further determining that the each of the first and second suspected short message sources are spammers based on the first and second sets of sending location change characteristics matching within a given threshold.

* * * * *